United States Patent
Wu (12)

(10) Patent No.: US 6,364,479 B1
(45) Date of Patent: Apr. 2, 2002

(54) ADJUSTING MECHANISM FOR SHAFT OF EYEGLASSES

(76) Inventor: Wen-Che Wu, No. 241, Tang Ding, Tang Ding Village, Hsin Shih, Tainan County (TW)

( * ) Notice: Subject to any disclaimer, the term of this patent is extended or adjusted under 35 U.S.C. 154(b) by 0 days.

(21) Appl. No.: 09/688,432

(22) Filed: Oct. 16, 2000

(51) Int. Cl.⁷ ................................................ G02C 5/14
(52) U.S. Cl. ...................................................... 351/120
(58) Field of Search .......................................... 351/120

(56) References Cited

U.S. PATENT DOCUMENTS 5,638,147 A * 6/1997 Wang-Lee ................... 351/120
5,980,038 A * 11/1999 Chen ............................ 351/120

* cited by examiner

*Primary Examiner*—Huy Mai
(74) *Attorney, Agent, or Firm*—Alan Kamrath; Rider, Bennett, Egan & Arundel, LLP

(57) ABSTRACT

A shaft of eyeglasses includes a front hinge member, a central sleeve member, and an ear piece. The front hinge member includes a front engagement member threadedly secured to an endpiece of the eyeglasses, a rear recessed member, a circular hole inside the rear recessed member, a notch on the periphery of the hole, a slope abutting the inside of the notch, and a projection on the rear end of the hinge member. The central sleeve member includes a first slot, a second slot with the projection received therein, and a protruded peg inserted into the hole. The protruded peg includes a protrusion slidably engaged with the notch, an arcuate groove movably engaged with the slope, a latched member having a tapered end, and an axial slit down the center of the protruded peg. The rear earpiece has a front portion inserted into the sleeve member. The angle of the sleeve member with respect to the hinge member is adjustable.

14 Claims, 3 Drawing Sheets

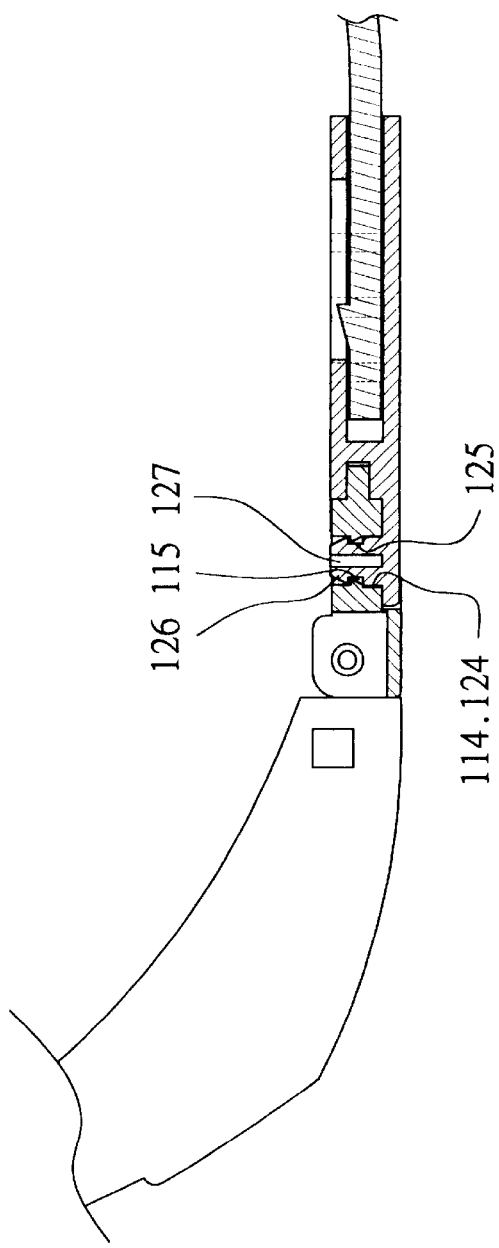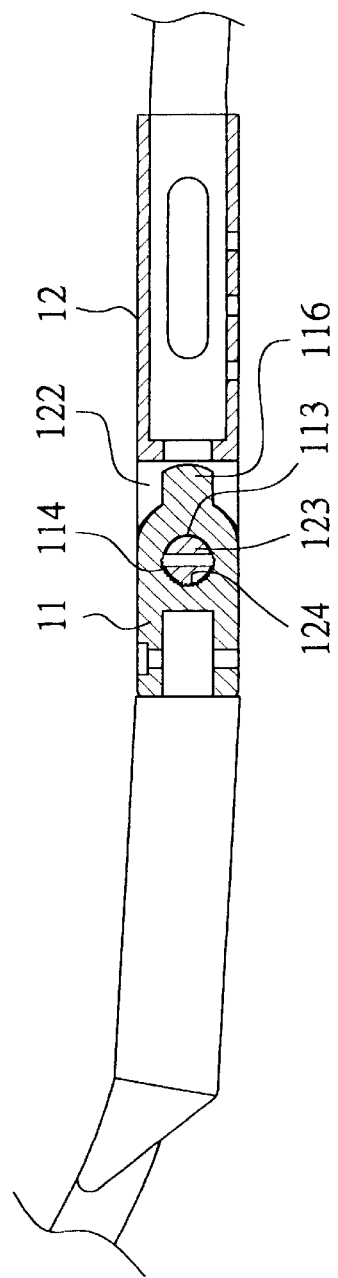
FIG. 3
FIG. 4

ADJUSTING MECHANISM FOR SHAFT OF EYEGLASSES

FIELD OF THE INVENTION

The present invention relates to eyeglasses and more particularly to an adjusting mechanism for a shaft of eyeglasses with improved characteristics.

BACKGROUND OF THE INVENTION

Conventionally, the shaft of eyeglasses is threadedly secured to the rim of eyeglasses. However, there is no disclosure about an adjusting mechanism for the shaft of eyeglasses for fulfilling a different need. Also, it is anticipated that there is great potential in the market for the type of product.

SUMMARY OF THE INVENTION

It is an object of the present invention to provide a shaft of eyeglasses comprising a front hinge member including a front engagement member being threadedly secured to an endpiece of the eyeglasses, a rear recessed member, a circular hole inside the rear recessed member, a notch on the periphery of the hole, a slope abutted the inside of the notch, and a projection on the rear end of the hinge member; a central sleeve member including a first slot, a second slot with the projection received therein, a protruded peg inserted into the circular hole, a protrusion slidably engaged with the notch, an arcuate groove movably engaged with the slope, a latched member having a tapered end, and an axial slit diametrically across and down the center of peg; and a rear earpiece having the front portion inserted into the sleeve member. The angle of the sleeve member with respect to the hinge member is adjustable.

The above and other objects, features and advantages of the present invention will become apparent from the following detailed description taken with the accompanying drawings.

BRIEF DESCRIPTION OF THE DRAWINGS

FIG. 3 is a top cross-sectional view of the assembled FIG. 1 device;

FIG. 4 is a side cross-sectional view of the assembled FIG. 1 device; and

DETAILED DESCRIPTION OF THE PREFERRED EMBODIMENTS

Figure 1:
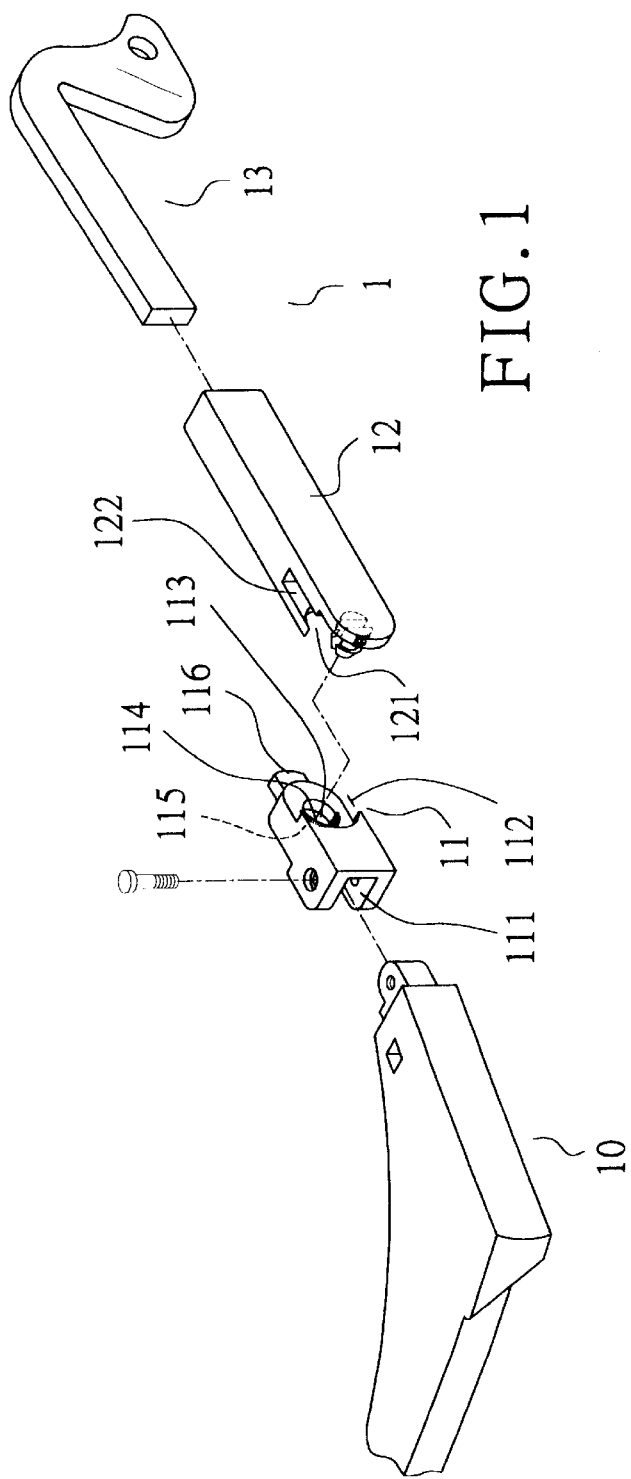
FIG. 1 is an exploded view of the shaft and the endpiece of eyeglasses incorporating an adjusting mechanism for the shaft according to the invention.
Figure 2:
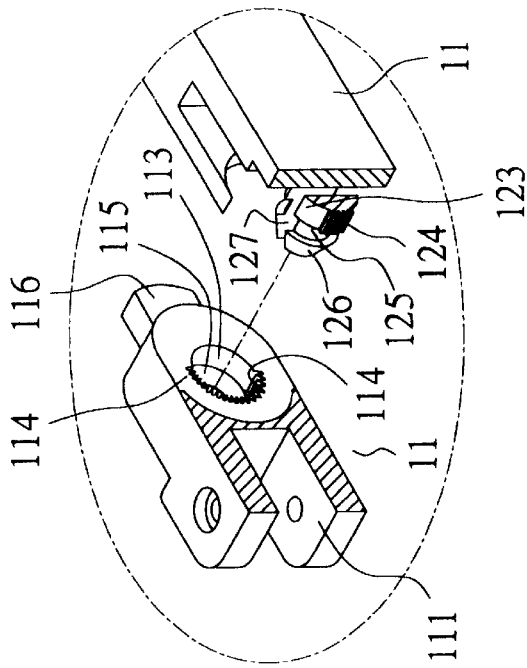
FIG. 2 is a greatly enlarged fragmentary view of the hinge member and the sleeve member shown in FIG. 1.

Referring to FIGS. 1 to 4, there is shown a shaft 1 and an endpiece 10 of eyeglasses incorporating an adjusting mechanism for the shaft 1 according to the invention. Shaft 1 comprises a front hinge member 11, a central sleeve member 12, and a rear earpiece 13 having the front portion inserted into sleeve member 12. Hinge member 11 comprises a front engagement member 111 being threadedly secured to the endpiece 10 of eyeglasses and a rear recessed member 112. A circular hole 113 is provided inside the rear recessed member 112 including a one or more notches 114 on the periphery of hole 113 and a slope 115 abutting the inside of notch 114. A projection 116 is provided on the rear end of the hinge member 11. Sleeve member 12 comprises a first slot 121, a second slot 122, and a protruded peg 123. The protruded peg 123 includes one or more protrusions 124, an arcuate groove 125, a latched member 126 having a tapered end, and an axial slit 127 down the center of peg 123 and diametrically across the protrusion 124, the arcuate groove 125, and the latch member 126.

The assembly of the above components is detailed below. First, insert the protruded peg 123 into the hole 113 such that the slope 115 is movably engaged with the arcuate groove 125 and the protrusions 124 are slidably engaged with notches 114. Finally, snap the projection 116 into the second slot 122.

Figure 5:
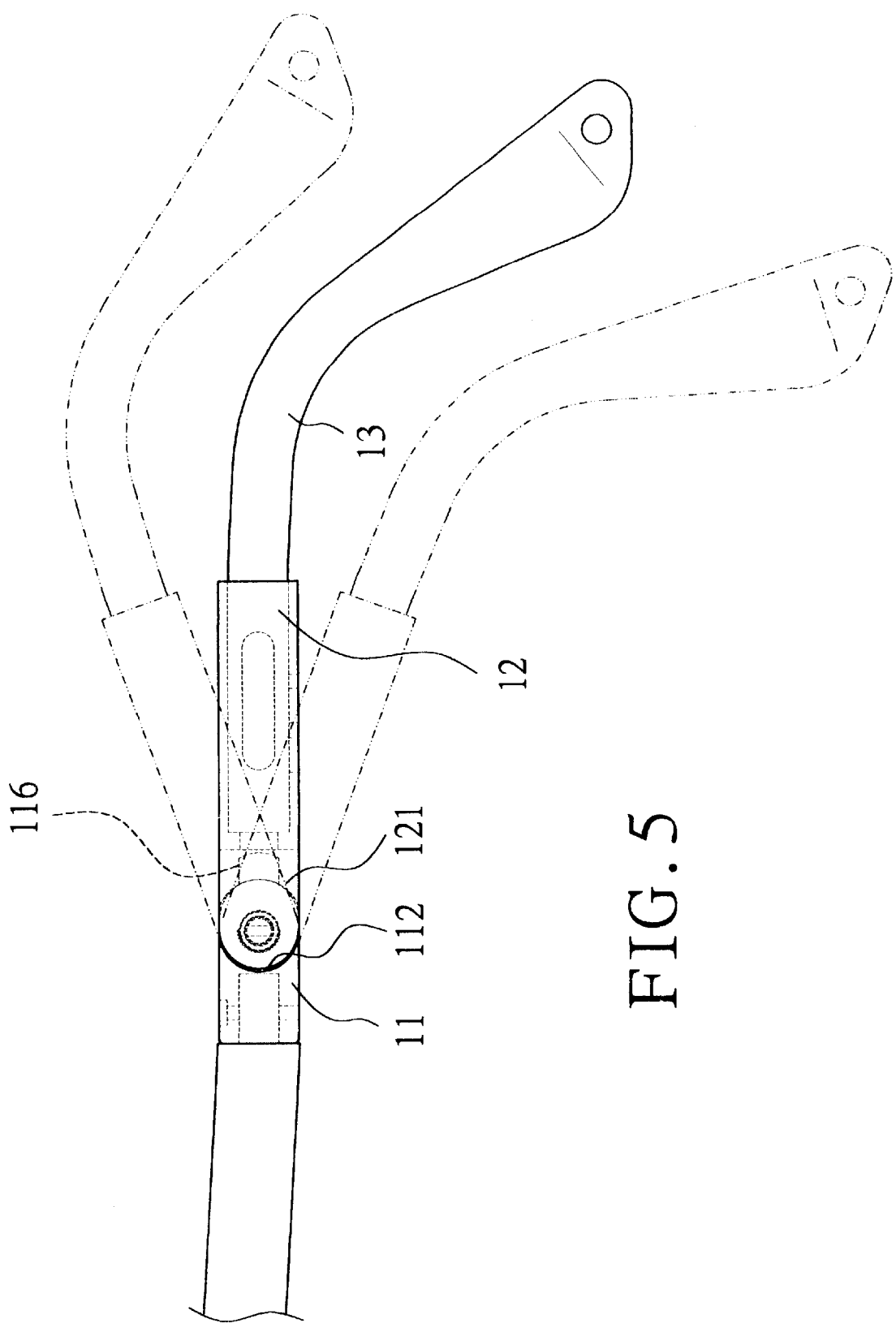
FIG. 5 is a side view schematically illustrating the operation of the FIG. 1 device.

Referring to FIG. 5, it is seen that an adjustment of a positive angle or negative angle (having the same degree as the positive angle) of sleeve member 12 with respect to hinge member 11 is made possible.

While the invention has been described by means of specific embodiments, numerous modifications and variations could be made thereto by those skilled in the art without departing from the scope and spirit of the invention set forth in the claims.

What is claimed is:

1. A shaft of eyeglasses comprising:
   a front hinge member including a front engagement member adapted to be hingedly secured to an endpiece of the eyeglasses, with the front hinge member including a circular hole having a periphery, and at least a first notch on the periphery of the circular hole, with the circular hole including a slope inside of the notch; and
   a central member including a protruded peg inserted into the circular hole, with the protruded peg including at least a first protrusion slidably engaged with the notch, an arcuate groove movably engaged with the slope, a latched member having a tapered end, and an axial slit extending diametrically across and down the center of the protruded peg, with a rear earpiece connected to the central member,
wherein the angle of the central member with respect to the hinge member is adjustable.

2. The shaft of eyeglasses of claim 1 with the front hinge member including a projection on a rear end, with the central member including a projection receiving slot with the projection received therein.

3. The shaft of eyeglasses of claim 2 with the central member being a sleeve, with the rear earpiece having a front portion inserted into the sleeve.

4. The shaft of eyeglasses of claim 3 with the front hinge member adapted to be threadedly secured to the endpiece of the eyeglasses.

5. The shaft of eyeglasses of claim 4 with the front hinge member further including a rear recessed member, with the circular hole being inside the rear recessed member, with the central member including a member receiving slot with the rear recessed member being received therein.

6. The shaft of eyeglasses of claim 5 with the protruded peg being integrally formed with the central member as a single component.

7. The shaft of eyeglasses of claim 2 with the front hinge member further including a rear recessed member, with the circular hole being inside the rear recessed member, with the central member including a member receiving slot with the rear recessed member being received therein.

8. The shaft of eyeglasses of claim 7 with the protruded peg being integrally formed with the central member as a single component.

9. The shaft of eyeglasses of claim 1 with the central member being a sleeve, with the rear earpiece having a front portion inserted into the sleeve.

10. The shaft of eyeglasses of claim 1 with the front hinge member adapted to be threadedly secured to the endpiece of the eyeglasses.

11. The shaft of eyeglasses of claim 1 with the front hinge member further including a rear recessed member, with the circular hole being inside the rear recessed member, with the central member including a member receiving slot with the rear recessed member being received therein.

12. The shaft of eyeglasses of claim 11 with the protruded peg being integrally formed with the central member as a single component.

13. The shaft of eyeglasses of claim 1 with the protruded peg being integrally formed with the central member as a single component.

14. The shaft of eyeglasses of claim 13 with the front hinge member including a projection on a rear end, with the central member including a projection receiving slot with the projection received therein.

* * * * *